US005854747A

United States Patent [19]

Fairlie

[11] Patent Number: 5,854,747

[45] Date of Patent: Dec. 29, 1998

[54] TRUSS JIGGING SYSTEM

[75] Inventor: John Fairlie, Vermont South, Australia

[73] Assignee: Mitek Holdings, Inc., Wilmington, Del.

[21] Appl. No.: 727,900

[22] Filed: Oct. 9, 1996

[51] Int. Cl.$^{6}$ .............................. G06F 19/00; B25B 1/20

[52] U.S. Cl. ........................ 364/468.21; 269/37; 269/910

[58] Field of Search ......................... 364/468.21, 468.01, 364/474.01, 474.02; 269/910, 37; 29/281.3; 100/913

[56] References Cited

U.S. PATENT DOCUMENTS

| | | | |
|---|---|---|---|
| 1,755,031 | 4/1930 | Schmuckler . | |
| 2,212,421 | 8/1940 | Henderson | 29/89 |
| 2,810,414 | 10/1957 | Wilson | 144/288 |
| 2,815,074 | 12/1957 | Dehn | 164/42 |
| 2,870,531 | 1/1959 | Hudson | 29/286 |
| 2,919,733 | 1/1960 | Johnson | 144/288 |
| 2,983,292 | 5/1961 | McKinley | 144/288 |
| 3,068,484 | 12/1962 | Moehlenpah et al. | 1/149 |
| 3,241,585 | 3/1966 | Jureit | 144/288 |
| 3,299,920 | 1/1967 | Koenigshof | 144/288 |
| 3,421,751 | 1/1969 | Menge | 269/305 |
| 3,552,254 | 1/1971 | Marczy | 83/461 |
| 3,667,379 | 6/1972 | Templin | 100/139 |
| 3,866,530 | 2/1975 | Moehlenpah | 100/53 |
| 4,084,498 | 4/1978 | Weaver | 100/210 |
| 4,154,436 | 5/1979 | Sellers | 269/321 F |
| 4,286,778 | 9/1981 | Follmeyer | 269/91 |
| 4,379,426 | 4/1983 | Thompson et al. | 100/100 |
| 4,453,705 | 6/1984 | McDonald | 269/37 |
| 4,514,901 | 5/1985 | Kirby | 29/822 |
| 4,567,821 | 2/1986 | McDonald | 100/100 |
| 4,627,564 | 12/1986 | Bowser | 227/152 |
| 4,650,106 | 3/1987 | Branaman | 227/152 |
| 4,669,184 | 6/1987 | Castillo | 29/798 |
| 4,711,437 | 12/1987 | Longenecker et al. | 269/91 |
| 4,819,475 | 4/1989 | Irvello | 72/447 |
| 4,821,408 | 4/1989 | Speller et al. | 29/701 |
| 4,943,038 | 7/1990 | Harnden | 269/37 |
| 4,995,146 | 2/1991 | Woods | 29/281.3 |
| 4,998,336 | 3/1991 | Papsdorf | 269/910 X |
| 5,085,414 | 2/1992 | Weaver | 269/37 |
| 5,092,028 | 3/1992 | Harnden | 29/709 |
| 5,211,108 | 5/1993 | Gore et al. | 100/48 |
| 5,342,030 | 8/1994 | Taylor | 269/37 |
| 5,361,495 | 11/1994 | Pyle et al. | 269/910 X |
| 5,385,339 | 1/1995 | Williams | 269/37 |
| 5,388,318 | 2/1995 | Petta | 29/407 |
| 5,617,622 | 4/1997 | Anderson | 269/910 X |
| 5,676,358 | 10/1997 | Shamblin et al. | 269/37 |
| 5,702,095 | 12/1997 | Williams | 269/37 |

OTHER PUBLICATIONS

Gang–Nail Systems, Inc., The Gang–Nail Easy Set System Manual, entitled "*Gang–Nail Easy Set Hardware*", 19 pages (Admitted prior art); date unknown.

MiTek Industries, Inc., "Mitek Easy–Set Jigging System" Brochure, 1993.

*Primary Examiner*—Joseph Ruggiero
*Attorney, Agent, or Firm*—Senniger, Powers, Leavitt & Roedel

[57] ABSTRACT

A jig system is disclosed which includes an assembly table which has a plurality of slots which extend across the width of the table. Pucks are arranged for movement along the openings on carriages which are mounted for sliding movement on rails. The carriages are connected to endless belts which travel around pulleys under the control of a motor for in turn moving the carriages to position the pucks. The motor is controlled by a computer and controller. The carriage has springs which support a plate so that the plate is biased upwardly above the table. Connectors may be located beneath a workpiece supported on the support surface so that when a force is applied to the plates, the plates and workpiece move downwardly against the bias of the springs so that the connector is forced into the workpiece. Cylinders and arms are provided for clamping the workpiece against the pucks. The pucks, cylinders and arms are provided on the support plate.

20 Claims, 3 Drawing Sheets

TRUSS JIGGING SYSTEM

BACKGROUND OF THE INVENTION

This invention relates to a jigging system for work pieces, and in particular, to a jigging system for the assembly of wooden trusses for use in building.

Wooden trusses generally comprise a number of wooden elements including a bottom chord, upper chords which are generally arranged in a V-shaped configuration, and connecting pieces between the chords. The chords and connecting pieces are joined together by metal connector plates which are usually forced into the joints between components on both sides of the truss by a suitable press or the like. Conventionally, the components from which the truss are to be made are laid out on a table which has stops (often referred to as pucks) for setting the position of the chords.

U.S. Pat. No. 5,085,414 to Weaver discloses a support table which has upwardly opening channels along which stops can slide. The stops are manually positioned and locked into predetermined positions in the channels dependent upon the shape of the truss which is required. The chords of the truss are then located against the stops to define the shape of the truss and connector plates are located and forced into the components to form the truss.

Manual location of the stops requires a considerable amount of time and in order to decrease the time taken to set up a jig for manufacturing a truss, automatic truss jigging system have been proposed.

One such automatic system is disclosed in U.S. Pat. No. 5,092,028 to Harnden. This jig utilizes a plurality of lead screws which are arranged in the channels. The lead screws carry the stops and stepper motors are provided for rotating the lead screws to drive the stops along the channels to locate them in a predetermined position. U.S. Pat. No. 5,342,030 to Taylor also discloses an automatic system in which a gantry and gantry carriage is provided on the table for moving the stops along the channels to locate them in a desired position.

Although Harnden and Taylor provide automatic relocation of the stops, which permits the truss assembly table to be reconfigured somewhat more quickly than Weaver to accommodate a different truss, additional improvements may be made. The lead screws of Harnden move the stops relatively slowly across the width of the truss assembly table, even at high rotational speeds of the lead screws. The gantry of Taylor moves only one stop at a time, and then must be moved longitudinally to the next slot in the table where a stop is to be relocated. Thus, there is still a need for a more rapid automatic truss assembly table set up system.

SUMMARY OF THE INVENTION

Among the several objects and features of the present invention may be noted the provision of a jig system which can be rapidly re-configured for forming trusses of different shapes; the provision of such a jig system which re-configures itself without manual intervention by laborers; the provision of such a jig system which rapidly re-positions powered clamps; the provision of such a jig system which readily receives wooden members that are curved; the provision of such a jig system which permits placement of connector plates on both the top and bottom sides of truss members in the jig system at the same time; and the provision of such a jig system which is easy to use.

Generally, a jig system for use in arranging components to form an assembly such as a truss comprises stops mounted for translational movement generally along respective lines to desired positions for locating the components to form the assembly. Stop moving means comprises a motive source and a driver acted on by the motive source for moving the driver. At least part of the driver moves in a direction parallel to the line of movement of the stop. Means connects the driver to the stop for moving the stop along its line of motion to the desired position.

In another aspect of the present invention, a jig system having stops and set forth above, and clamping means for clamping the components against the stops. The clamping means is operable to clamp components against the stops in different desired positions of the stops.

In yet another aspect of the present invention, a jig system is used in association with reaction surface means to arrange components to form an assembly such as a truss, and to support the components as connectors are driven into the components to connect the components together. Generally, the jig system comprises stops for locating the components to form the assembly and component supports for supporting components of the assembly. Resilient members supporting the component supports away from the reaction surface means, so that connectors may be positioned between the components and the reaction surface means, are resiliently yieldable under a force applied to the components to move the component supports to press the connectors and the components against the reaction surface means to drive the connectors onto the components.

DETAILED DESCRIPTION OF THE PREFERRED EMBODIMENT

Figures 1, 6:
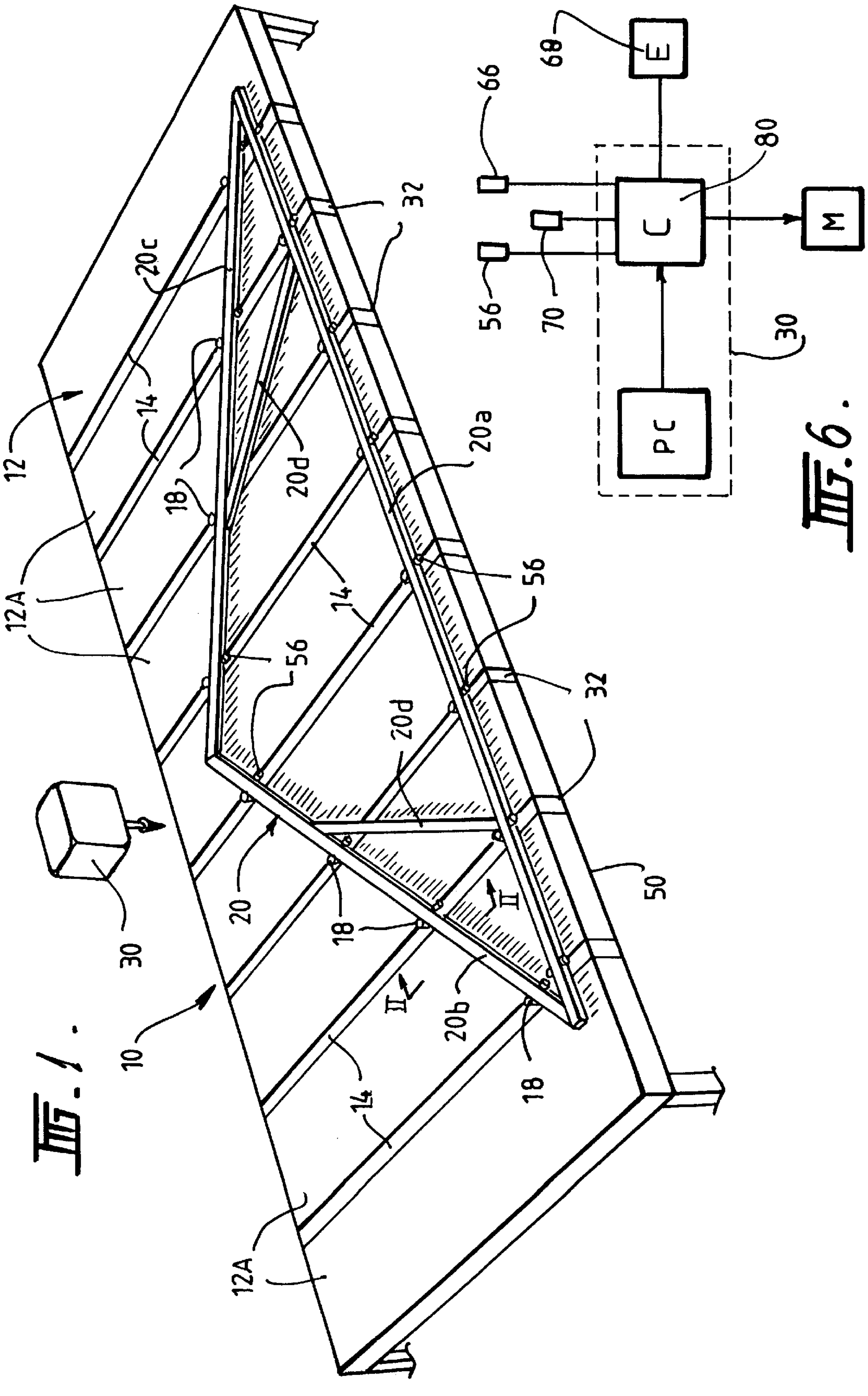
FIG. 1 is a perspective view of a jigging system according to the preferred embodiment of the invention.
FIG. 6 is a schematic view of a control system for controlling the jig of FIGS. 1 to 5.

With reference to the drawings, an assembly table 10 is shown which may typically be up to 30 meters in length and 4.2 meters in width. The table 10 has an upper platform generally indicated at 12, formed from solid sheets 12A or rails or the like which are spaced apart to provide a plurality of openings 14 which, in the embodiment of FIG. 1 extend across the width of the table. Rather than extend across the width of the table as shown in FIG. 1, the openings 14 could also extend lengthwise or at an angle across the table if desired. The upper platform 12 constitutes reaction surface means in the preferred embodiment.

Arranged for movement along the openings 14 in a manner to be described hereinafter are a plurality of stops or pucks 18. Typically, the shape of a truss 20 is known and its details are fed into a control system 30, which controls movement of the pucks 18. The pucks 18 are then moved in a manner which will be described hereinafter to positions needed to locate truss components for forming the truss 20. Chords 20*a,* 20*b,* 20*c* from which the truss is to be formed are laid out together with connecting pieces 20*d,* with the chords abutting the pucks 18. Connector plates are then located on both sides of the truss 20 at the joints of the chords 20*a,* 20*b,* 20*c* and the connecting pieces 20*d,* and the connector plates are driven into the truss 20 by presses or the like (not shown) to form the truss 20. The truss 20 is then removed from the table 10 and new components, such as the chords referred to above, are located in place to form a new truss. If the shape of the new truss is different, the pucks 18 are first moved under the control of the control system 30 to new positions for locating truss components of the new truss.

Figure 2:
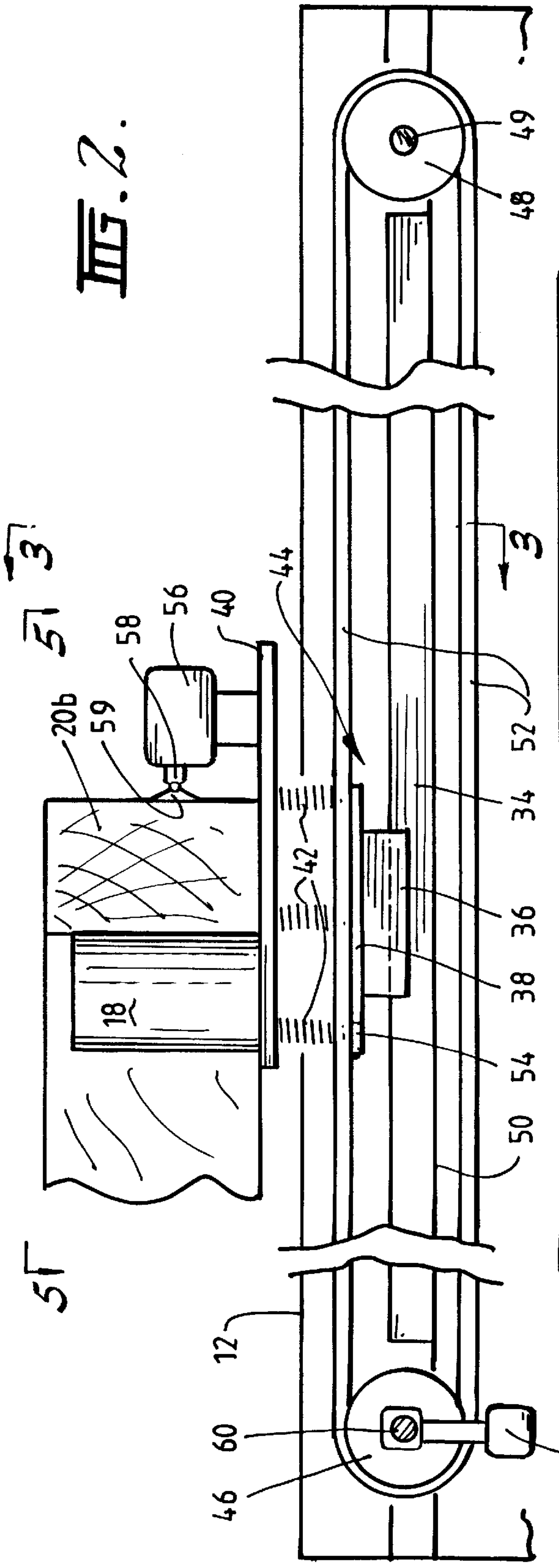
FIG. 2 is a view along the line II—II of FIG. 1.
Figure 3:
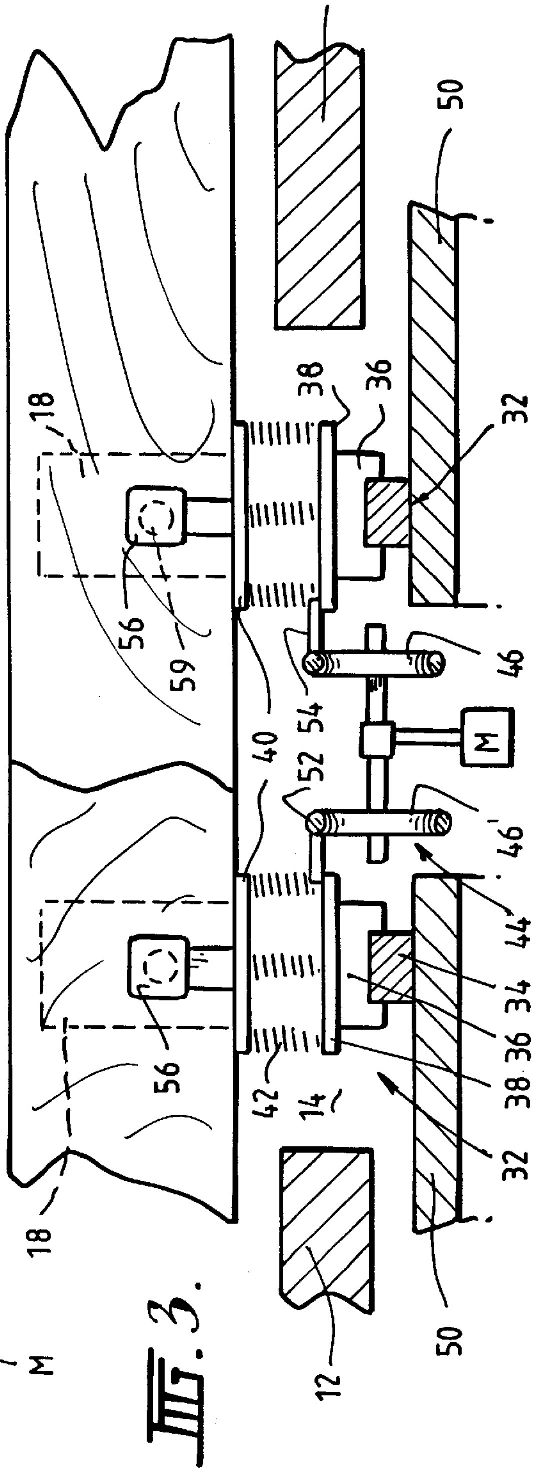
FIG. 3 is a view along the line III—III of FIG. 2.

With reference to FIGS. 2 and 3, the mechanism for moving the pucks 18 will be disclosed. Each of the openings 14 is provided with two linear bearing head and rail assemblies 32. Such devices are well known and therefore will not be described in detail hereinafter other than to say they comprise a rail 34 upon which a head 36 is mounted for sliding movement on the rail 34. Each of the heads 36 carry a carriage 38 and each of the carriages 38 support a workpiece support plate 40 which is coupled to the carriage 38 by springs 42 which bias the plate 40 upwardly to a position above the platform 12.

The assemblies 32 are supported on a suitable support frame 50 which is mounted beneath the table 10. Also supported on the frame 50 are two pairs of pulley and endless belt assemblies 44. As best shown in FIG. 2, each assembly 44 comprises a driven pulley 46 (broadly, "a driver") and a tensioner pulley 48 about which an endless belt 52 can travel. Each of the endless belts 52 (broadly, "means for connecting the driver to the stop") is coupled to one to the carriages 36 by a rigid clamp assembly 54 so that the carriages 36 are securely connected to the endless belts 52.

A puck 18 is mounted on each of the plates 40. The plates 40 also carry hydraulic, pneumatic or electromagnetically actuated cylinders 56 which have arms 58. The arms 58 may be provided with a foot 59 for engaging the truss 20 as will be described in more detail hereinafter.

When the endless belts 52 are driven about the pulleys 46 and 48, the carriage 38 is moved with the endless belt 52 and therefore the head 36, carriage 38 and plate 40 together with the puck 18 and cylinder 56 also move with the belt 52 by virtue of sliding engagement of the head 36 on the rail 34. The velocity of the surface of each driven pulley 46 engaging its corresponding belt 52 at the point where the upper reach of the belt leaves the surface of the pulley is substantially parallel to the line of motion of the corresponding puck 18 along the length of the opening 14. The belt 52 is driven directly by the driven pulley 46 in a direction parallel to the line of motion of the puck at speeds closely corresponding to those of the speed of the surface of the pulley which engages the belt. Thus, the belt 52 and the puck 18 connected thereto may be rapidly moved along the length of the opening 14. In contrast, the velocity of no point on a lead screw extending lengthwise under an opening in a truss assembly table is parallel to the line of motion of the puck. The rotary motion must be converted to linear motion in a direction perpendicular to the instantaneous velocity of any point on the lead screw, which is accomplished by a threaded connection of a puck carrier to the lead screw. As a result, the linear velocity of the puck driven by the lead screw is substantially less than the instantaneous velocity of a point on the lead screw.

It is envisioned that the belts 52 and pulleys 46, 48 may be replaced by chains and sprockets, or that the belt may be replaced by a flexible cable or other endless flexible member, while retaining the same advantages stated above. Moreover, it is further contemplated that rodless or another type of cylinder (not shown) under each opening 14 could be employed in place of the belt 52 and pulleys 46, 48. It will be noted that in the case of the such cylinders, the driver would constitute the piston within the cylinder moved by pneumatic or hydraulic pressure. In that event the velocity of the piston would also be parallel to the permitted linear motion of the puck connected to it, permitting the puck to be repositioned as rapidly as the piston can be moved within the cylinder.

Each pulley 48 is mounted on a shaft 58 and forms an idler pulley or tensioning pulley for tensioning the belts 52. The other pulleys 46 are mounted on a common shaft 60 which is driven by a motor M. The motor M is preferably a two speed motor having a high speed and a lower speed. However, it is to be understood that there could be a separate motor (not shown) for each drive pulley without departing from the scope of this invention. Moreover, the drive pulleys 46', 46 could be mounted for conjoint rotation with the motor shaft.

Figure 4:
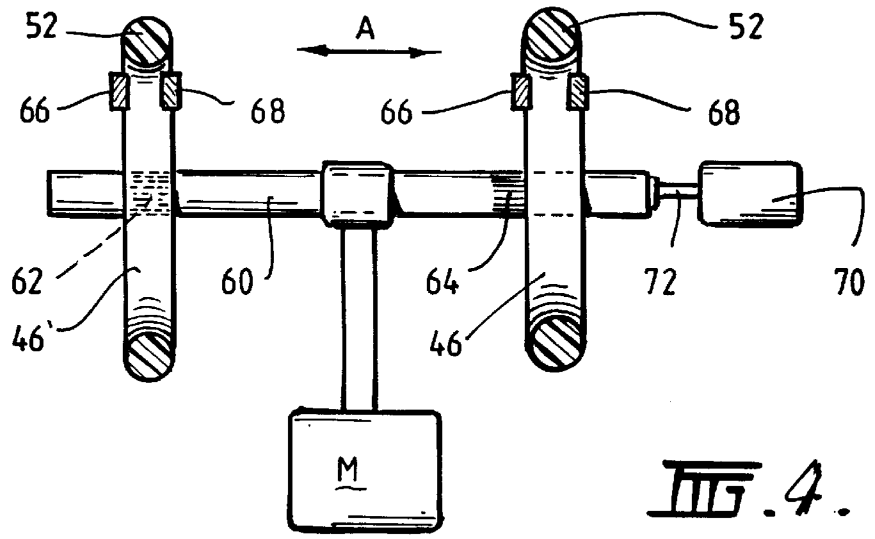
FIG. 4 is a detailed end view of part of the assembly of FIG. 3.
Figure 5:
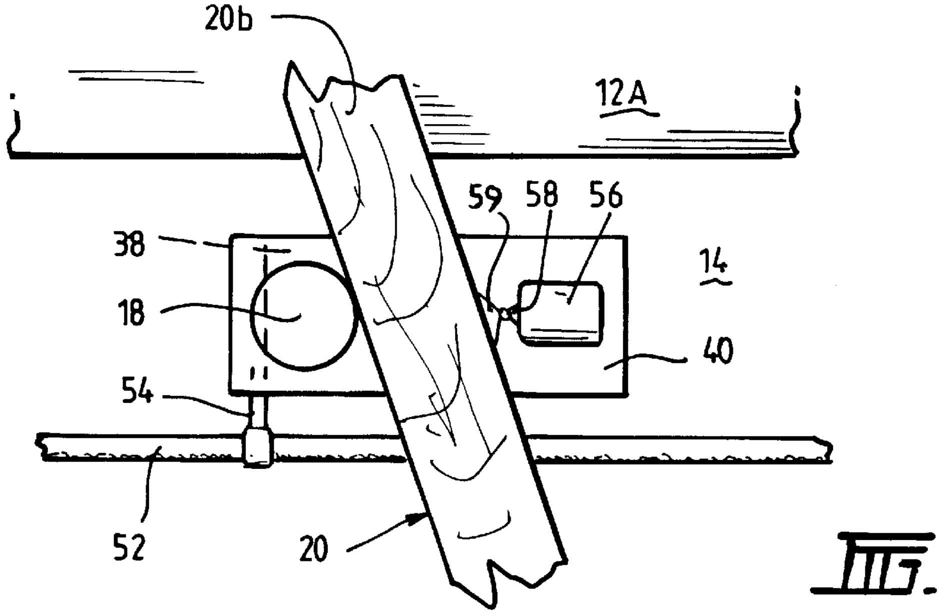
FIG. 5 is a top plan view from the vantage indicated by the line V—V of FIG. 2.

As is best shown in FIG. 4, the shaft 60 is provided with a first set of splines 62 and a second set of splines 64. The shaft 60 is arranged for movement in the direction of double headed arrow A relative to the pulleys 46 by a solenoid 70 which has an armature 72 coupled to the shaft 60. Upon actuation of the solenoid 70, the armature 72 is selectively pulled into the solenoid 70 or moved out of the solenoid 70 to thereby move the shaft 60 in the directions indicated by double headed arrow A. In the position shown in FIG. 4 in which the armature 72 is out of the solenoid 70, the splines 62 engage corresponding splines on the pulley labelled 46' in FIG. 4 so that upon rotation of the shaft 60 by the motor M, the pulley 46' is driven to thereby move the endless belt 52 associated with that pulley. In order to switch drive to the other pulley 46, the solenoid 70 is activated so that the armature 72 is drawn into the solenoid 70 thereby shifting the shaft 60 to the right in FIG. 4. This will disengage the spline 62 from the pulley 46' and engage the spline 64 with the other pulley 46 so that the other pulley 46 can be driven.

The pulleys 46 are provided with an encoder 68 for providing an indication of the position of the pulleys 46 to in turn provide an indication of the amount of movement of the belts 52 so that the position of the carriage 38 and therefore the pucks 18 can be determined. The pulleys 46 also have disc brake assemblies 66 for stopping and locking the pulleys 46 to thereby securely locate the pucks 18 at a desired position.

The cylinders 56 are positioned a suitable distance from pucks 18 so that when the arm 58 is retracted, a chord 20*b* of the truss 20 of the largest size which may be required can easily fit between the puck 18 and the cylinder 56. The chords 20*a,* 20*b* and 20*c* are then laid out on plates 40 by locating the chords between the pucks 18 and the cylinders 56 with the chords 20*a,* 20*b* and 20*c* generally abutting corresponding pucks 18. The cylinders 56 are then activated so that arms 58 are extended to cause feet 59 to engage the chords 20*b* and clamp the chords 20*b* against the pucks 18. Thus, the chords 20*b* are securely clamped between the pucks 18 and the cylinders 56. Clamping of the chords in this manner ensures that if the chords are curved slightly they are generally forced into the desired orientation hard against the pucks 18 to ensure that the truss 20 is properly positioned and does have the shape defined by the pucks 18. The cylinders 56 are controlled by a manual switch (not shown) which is actuated after the chords 20*a,* 20*b* and 20*c* and the connectors 20*d* have been positioned.

Figure 7:
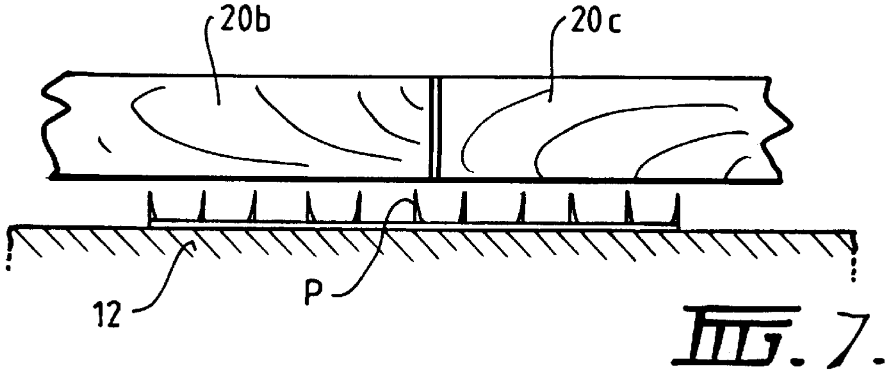
FIG. 7 is a view showing a connector plate beneath a truss joint.

When the chords 20*a,* 20*b* and 20*c* of the truss 20 are laid out on the jig, the chords rest between pucks 18 and cylinders 56 on the support plates 40. Thus, the chords 20*a,* 20*b* and 20*c* which form the truss 20 are located above the platform 12 of the table 10 as is clearly shown in FIGS. 2, 3 and 7. This enables connector plates, such as plate P (FIG. 7) to be located beneath the chords 20*a,* 20*b* and 20*c* so that those connector plates are located between the platform 12 and the chords 20*a,* 20*b* and 20*c*. Other connector plates are located on the top surface of the truss 20 and the truss 20 is then pressed by a suitable press to drive the connector plates into the chords 20*a,* 20*b* and 20*c.* As the press is operated, the truss 20 is forced downwardly against the bias of the springs 42 which support the plates 40 so that the truss 20 lowers onto the platform 12. As the truss 20 is forced downwardly by the pressing action, the connector plates which were located on the platform 12 under the truss 20 are driven into the truss 20 so that the chords 20*a,* 20*b,* and connecting pieces 20*c* 20*d* are joined together to form the truss 20.

Thus, the connector plates which are to be inserted into the lower surface of the truss 20 can be located in place without the need for lifting the truss 20.

FIG. 6 schematically illustrates the control system 30 for controlling the jig. The control system 30 includes a portable computer PC which is coupled to a controller 80. The controller 80 is then in turn coupled to motor M, encoder 68 and also controls solenoid 70 and disc brakes 66. One controller 80 can be used to control, for example, six pucks 18 and therefore the controller 80 shown in FIG. 6 can be used to control both of the pucks shown in FIGS. 2 and 3 together with another pair of pucks arranged in another opening 14 and yet a further pair of pucks 18 arranged in yet a further opening 14. In the instance where the table 10 has forty-two pucks, seven controllers 80 connected to the PC for controlling the jig are used. The controller 80 which controls each set of six pucks 18 will also control the associated motor M, encoder 68, brakes 66 and solenoid 70 associated with those pucks. However, a greater or fewer number of controllers could be employed without departing from the scope of the present invention.

Each of the controllers 80 therefore controls six of the pucks 18. The channels can conveniently be identified as channels A, B, C, D, E and F. The controller 80 obtains information identifying the position of each of the pucks 18 which it is to control. Information relating to the position of the pucks 18 is fed to the controller 80 from the encoder 68 on the pulleys 46.

Information relating to a truss layout is fed into the PC and that information is then provided to the controller 80. Initially the pucks 18 are moved to a zero position by the controller 80. The controller 80 selects channel A, for example, and knowing the position of the puck associated with that channel, it will compare the required position to the actual position of the puck 18 (and of the carriage 38 carrying a puck and cylinder 56). A command is issued from the controller 80 to the brake 66 associated with the relevant puck 18 so that the brake 66 is released. An output is supplied to solenoid 70 to ensure that the shaft 60 is moved into the position so that the spline 62 or 64 engages the appropriate pulley 46 and a voltage is supplied to the motor M to drive the shaft 60 at high speed. The shaft 60 rotates the pulley 46 to drive the appropriate belt 52 about the pulleys 46 and 48 to move the support platform 40 to the desired position to correctly position the puck 18. When the puck 18 comes to within a specified distance from its required position (which may be indicated by a number of counts issued from encoder 68) the motor speed is switched to low speed by the controller 80. Typically this will occur after one or two seconds of running. Again, when the puck 18 is within the specific number of counts of the actual position required, the controller 80 issues a signal to disc brake 66 to apply the brake 66 to stop the pulley 46 so that the puck 18 comes to rest at the required position. The motor M is then switched off. The specific number of counts at which the motor is reduced to low speed and at which the brake is applied can be determined by the system response time and could be adjustable and preset in the controller 80. The controller then selects channel B so that the next puck can be moved. The solenoid 70 is operated to disengage splines 62 of shaft 60 from the pulley 46 and to engage the other spline 64 with its pulley 46. The same procedure as outlined above is then repeated. Similar operations occur for channels C and D and for channels E and F so that each of the pucks can be positioned in a required position.

For any truss configuration only some of the pucks which may be provided may be used. Those pucks which need not be used for a particular truss configuration can be controlled so that they are merely moved to the edge of the table so that they are completely out of the way of the truss 20 which is to be manufactured.

Thus, according to the preferred embodiment of the invention, the jig system can be automatically set up to receive components of a truss and the truss can be easily manipulated to enable connector plates to be inserted in place for formation of the truss. Thus, not only is set up of the jig quickly effected, but formation of the truss is also more easily and quickly performed.

Since modifications within the spirit and scope of the invention may readily be effected by persons or ordinary skill in the art, it is to be understood that this invention is not limited to the particular embodiment described by way of example hereinabove.

What is claimed is:

1. A jig system for use in arranging components to form an assembly such as a truss, the jig system comprising:

an upper platform;

stops mounted for translational movement generally along respective lines to desired positions for locating the components to form the assembly, at least a portion of each stop being disposed above the upper platform;

stop moving means for the stops, said stop moving means comprising a motive source, a driver acted on by the motive source for moving the driver, the driver being disposed below the upper platform, at least part of the driver being movable in a direction parallel to the line of movement of the stop, means for connecting the driver to the stop for moving the stop along its line of motion to the desired position.

2. A jig system as set forth in claim 1 wherein the driver comprises a drive wheel member, said motive source being adapted for connection to the drive wheel member for powering rotation of the drive wheel member, and wherein said connecting means comprises an endless flexible member extending in a circuit between the drive wheel member and another wheel member, the endless flexible member being driven by the drive wheel member for movement around the circuit and being coupled to the stop for movement of the stop with the flexible member.

3. A jig system as set forth in claim 2 wherein the endless flexible member comprises an endless belt, the drive wheel member and said other wheel member comprising pulleys around which the endless belt extends.

4. A jig system as set forth in claim 2 further comprising clamping means for clamping the components against the stops.

5. A jig system as set forth in claim 4 wherein said clamping means comprises clamps mounted for movement with corresponding stops, the clamps being capable of actuation from a remote location.

6. A jig system as set forth in claim 2 further comprising rails and carriages riding on the rails which are connected to corresponding endless flexible members for movement with the endless flexible members, the carriages carrying the stops and clamps.

7. A jig system as set forth in claim 2 wherein the upper platform includes a reaction surface for supporting the components as connectors are driven into the components to connect the components together, the jig system further comprising:

component supports for supporting components of the assembly, the component supports mounting the stops and being movable relative to the reaction surface to place the stops in the desired positions;

resilient members for supporting the component supports away from the reaction surface so that connectors may be positioned between the components and the reaction surface, the resilient members being resiliently yieldable under a force applied to the components to move the component supports for pressing the connectors and the components against the reaction surface to drive the connectors onto the components.

8. A jig system as set forth in claim 2 wherein the motive source comprises a plurality of motors, and wherein the jig system further comprises a drive shaft associated with each motor and means for selectively engaging the drive shaft with the drive pulleys associated with different endless flexible members for driving the flexible members independently of each other.

9. A jig system as set forth in claim 8 wherein said means for selectively engaging the drive shaft with the drive pulleys comprises a solenoid associated with each drive shaft for moving the drive shaft longitudinally, the drive shaft having two sets of splines thereon, one set of splines being engageable with one of the drive pulleys for interconnecting the motor and the one drive pulley and the other set of splines being engageable with the other of the drive pulleys for interconnecting the motor and the other drive pulley.

10. A jig system as set forth in claim 1 further comprising a control system for individually controlling the movement of the stops to place the stops in the predetermined desired positions according to the shape of the assembly to be formed.

11. A jig system for use in arranging components to form assemblies such as trusses of different configurations, the jig system comprising:

stops mounted for translational movement generally along respective lines to different desired positions for locating the components to form the assemblies having different configurations;

powered clamping means for clamping the components against the stops, said powered clamping means being mounted for translational movement to different desired positions for locating components to form the assemblies of different configurations, and being operable for powered clamping of components against the stops in different desired positions of the stops.

12. A jig system as set forth in claim 11 wherein said clamping means comprises clamps mounted for movement with corresponding stops, the clamps being capable of actuation from a remote location.

13. A jig system as set forth in claim 12 further comprising rails and carriages riding on the rails, the carriages carrying the stops and clamps.

14. A jig system as set forth in claim 11 further comprising a control system for individually controlling the movement of the stops to place the stops in the predetermined desired positions according to the shape of the assembly to be formed.

15. A jig system for use in association with reaction surface means to arrange components to form an assembly such as a truss, and to support the components as connectors are driven into the components to connect the components together, the jig system comprising:

stops for locating the components to form the assembly;

component supports for supporting components of the assembly;

resilient members for supporting the component supports away from the reaction surface means so that connectors may be positioned between the components and the reaction surface means, the resilient members being resiliently yieldable under a force applied to the components to move the component supports to press the connectors and the components against the reaction surface means to drive the connectors onto the components.

16. A jig system as set forth in claim 15 wherein the component supports mount the stops and are movable relative to the reaction surface means to place the stops in desired positions to form the assembly.

17. A jig system as set forth in claim 16 further comprising clamping means for clamping the components against the stops.

18. A jig system as set forth in claim 17 wherein said clamping means comprises clamps mounted on the component supports for movement with corresponding stops, the clamps being capable of actuation from a remote location.

19. A jig system as set forth in claim 18 further comprising rails and carriages riding on the rails, the carriages carrying component supports.

20. A jig system as set forth in claim 15 further comprising a control system for individually controlling the movement of the stops to place the stops in the predetermined desired positions according to the shape of the assembly to be formed.

* * * * *